United States Patent [19]

Holder

[11] Patent Number: 5,137,284
[45] Date of Patent: Aug. 11, 1992

[54] STATIONARY SEAL RING ASSEMBLY FOR USE IN DRY GAS FACE SEAL ASSEMBLIES

[75] Inventor: Mark C. Holder, Mohnton, Pa.

[73] Assignee: Stein Seal Company, Kulpsville, Pa.

[21] Appl. No.: 495,436

[22] Filed: Mar. 16, 1990

[51] Int. Cl.⁵ .......................... F16J 15/38; F16J 15/34
[52] U.S. Cl. .......................... 277/3; 277/27; 277/85; 277/96.1; 277/96.2
[58] Field of Search .............. 277/27, 85, 87, 96.1, 277/3, 74, 75, 81 R, 96.2

[56] References Cited

U.S. PATENT DOCUMENTS

| | | | |
|---|---|---|---|
| 3,704,019 | 11/1972 | McHugh | 277/96.1 X |
| 4,212,475 | 7/1980 | Sedy | 277/96.1 |
| 4,335,888 | 6/1982 | Ohba et al. | 277/96.1 |
| 4,511,149 | 4/1985 | Wiese | 277/27 X |
| 4,848,774 | 7/1989 | Nyilas | 277/27 X |
| 4,889,348 | 12/1989 | Amundson et al. | 277/96.1 |

FOREIGN PATENT DOCUMENTS

| | | | |
|---|---|---|---|
| 694086 | 9/1964 | Canada | 277/74 |
| 1948234 | 4/1971 | Fed. Rep. of Germany | 277/27 |
| 996546 | 6/1965 | United Kingdom | 277/27 |

Primary Examiner—Allan N. Shoap
Attorney, Agent, or Firm—John F. A. Earley; John F. A. Earley, III

[57] ABSTRACT

A stationary seal ring assembly for a dry gas face seal unit which comprises a face seal ring adapted to cooperate with a rotating mating ring mounted on a shaft, a shroud mounted on the periphery of the face seal ring to prevent the ring from bending or deflecting when subjected to unbalanced gas pressures, and mounting apparatus connected between the face seal and the shroud for mounting the shroud onto the face seal ring, the mounting apparatus comprising a support ring and a retaining ring which, together with the shroud, urge a pair of seals against the opposite faces of the stationary seal ring. The face seal ring also includes a pair of static annular grooves formed in the mating face of the seal ring, with a plurality of recesses extending between the annular grooves, whereby the high-pressure gas is deflected against the radial and axial faces of the annular grooves to evenly distribute high-pressure gas on the mating surface of the seal ring to tend to prevent deflection and bending of the stationary seal ring.

4 Claims, 3 Drawing Sheets

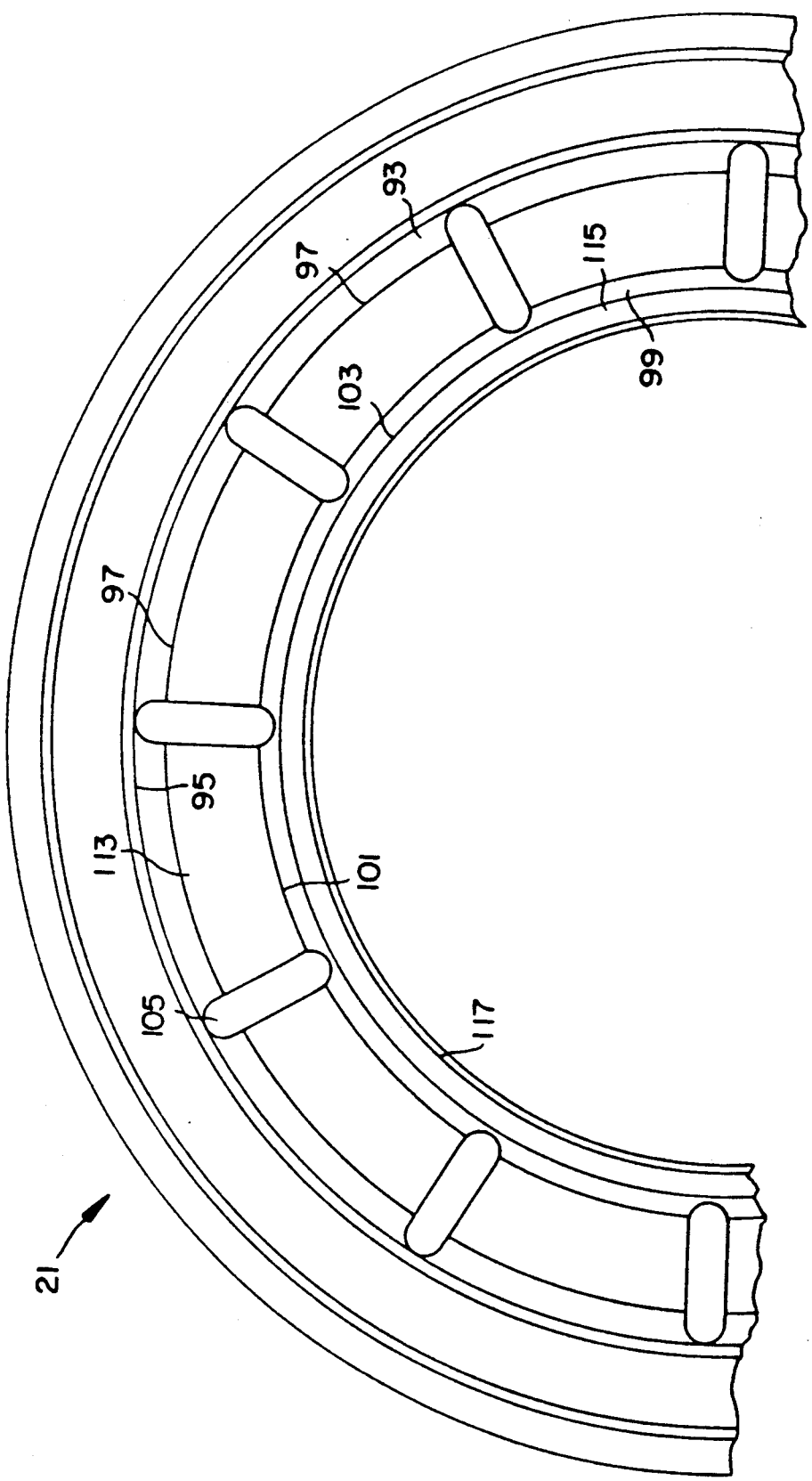

STATIONARY SEAL RING ASSEMBLY FOR USE IN DRY GAS FACE SEAL ASSEMBLIES

BACKGROUND OF THE INVENTION

1. Field of the Invention

This invention relates to dry gas face seal units for sealing the space between a rotating shaft and a stationary housing against leakage of high-pressure gas. Such dry face seals are used in industrial compressors and gas or steam turbines at a wide range of operating pressures. The term "dry gas face seals" is defined as end face seals which are dry in that they do not use a liquid lubricant, but instead use the gas as a lubricant between the end faces of the seals. In particular, this invention relates to the construction of the stationary seal ring assembly.

2. Description of the Prior Art

Certain dry gas face seals use a stationary seal ring assembly which comprises a simple, unsupported carbon ring. This construction, however, allows for appreciable structural deformations and deflection in the ring when it is subjected to the pressure of the gas being sealed. Further, if a wide range of pressures is encountered, pressure balancing of the ring in the axial sense at all pressures is difficult. An example of this type of end face seal construction is disclosed in U.S. Pat. No. 4,212,475, issued Jul. 15, 1980, which is incorporated herein by reference. Accordingly, there is need for a stationary dry gas seal assembly that operates under the influence of pressure with little resulting load and structural deflection of the sealing ring. Further, this seal assembly must be axially balanced and must maintain axial pressure balancing integrity under a wide range of operating pressures.

SUMMARY OF THE INVENTION

The present invention relates to a stationary seal ring assembly contained within a dry gas face seal. This invention has the capability of functioning under a wide range of operating pressures and has the object of eliminating or substantially reducing any deflections in the radial face of a sealing ring and thereby reduce any gas leakage. This device is especially adaptable for use in industrial compressors and gas or steam turbines.

The stationary seal ring assembly of this invention is mounted in a stationary seal housing. The seal ring assembly and the seal housing are both suitably fixed against rotation. The gas being sealed exerts its pressure on the outer periphery of the ring assembly, on both radially extending faces of the ring, and on a portion of the inner periphery of the stationary seal ring, with the remainder of the inner periphery being subjected to some lower pressure. A rotatable mating ring, generally made of a hard material, is affixed to a rotating shaft which extends through the stationary seal housing. A radially extending planar surface on the rotating mating ring cooperates with the radially extending planar surface of the stationary seal ring. A plurality of springs extend between the stationary seal housing and stationary seal ring and urge the stationary seal ring toward the rotating mating ring. Further, a sealing ring 31, like a piston ring, usually made of carbon with a gap cut in it, is mounted in an annular groove in the stationary housing. The sealing ring is urged radially against an inner circumference of the stationary seal ring and against a radially extending surface of the groove in the stationary seal housing by mechanical and pressure forces.

The stationary seal ring assembly is comprised of a face seal ring, a shroud, a support ring, a retaining ring, and two static seals. The face seal ring is usually made of carbon or silicon carbide. The shroud, supporting ring, and retaining ring are usually made of suitable metallic materials, like steel, generally all being made of the same material to avoid thermal distortions. The two static seals are identical in design and usually are elastomeric O-rings or the like, or rings of suitable material like carbon piston rings, depending upon temperature the rings are subjected to.

The shroud fits over the outermost circumferences of the face seal ring by a clearance fit with the static seals abutting both radial faces of the face seal ring. The static seals also abut the inner circumference of the shroud which is mounted over the outer circumference of the face seal ring. A static seal 55 abuts the outermost radially extending planar sealing surface 27 of the face seal ring 28 with the opposite side of the static seal 55 abutting an inner radial face of the shroud 43. The radially extending planar sealing surface 27 of the face seal ring 28 contains a plurality of recesses 105 extending radially and communicating with an outer groove 93 and inner annular groove 99. Three planar surfaces result on the radially extending sealing face 27. The outermost, as previously described, abuts a static seal. The innermost planar surface performs the sealing function at the rotating interface with sealing face 29 having an outer and inner diameter. The remaining center planar surface on said sealing face 27 also engages the rotating mating ring and serves as a bearing surface to reduce unit loading. This bearing surface 27 can accommodate various aerodynamic-type, film-riding geometries if the need arises. The radially extending planar sealing surface 29 of the mating ring 25 extends radially beyond the outer circumference of the center planar sealing surface on the face seal ring 28.

The opposing radially extending surface of the face seal ring, or side counter to the planar sealing surface, contains an outer and inner recessed annular step. The diameter defined by the inner recessed annular step has a defined space relationship with the inner and c ter diameters of the innermost planar sealing surface on the opposing radially extending sealing surface. This defined space relationship constitutes pressure balancing in the axial sense. The radially extending surface resulting from the outer recessed annular step has an axially defined space relationship with the piston ring mounted in the stationary seal housing.

A plurality of holes extend radially through the face seal ring from the outermost circumference to the inner circumference and serve to exhaust to the low-pressure side any gas leakage occurring at the location of the two static seals. The pressure load, therefore, is substantially accommodated by the shroud with essentially little resulting load affecting the face seal ring and, therefore, with very little structural deflection of the ring 28 occurring in any sense.

BRIEF DESCRIPTION OF THE DRAWINGS

FIG. 4 is a view in elevation of a portion of the sealing face of the stationary seal ring of FIG. 1.

DETAILED DESCRIPTION OF THE DRAWINGS

Figure 1:
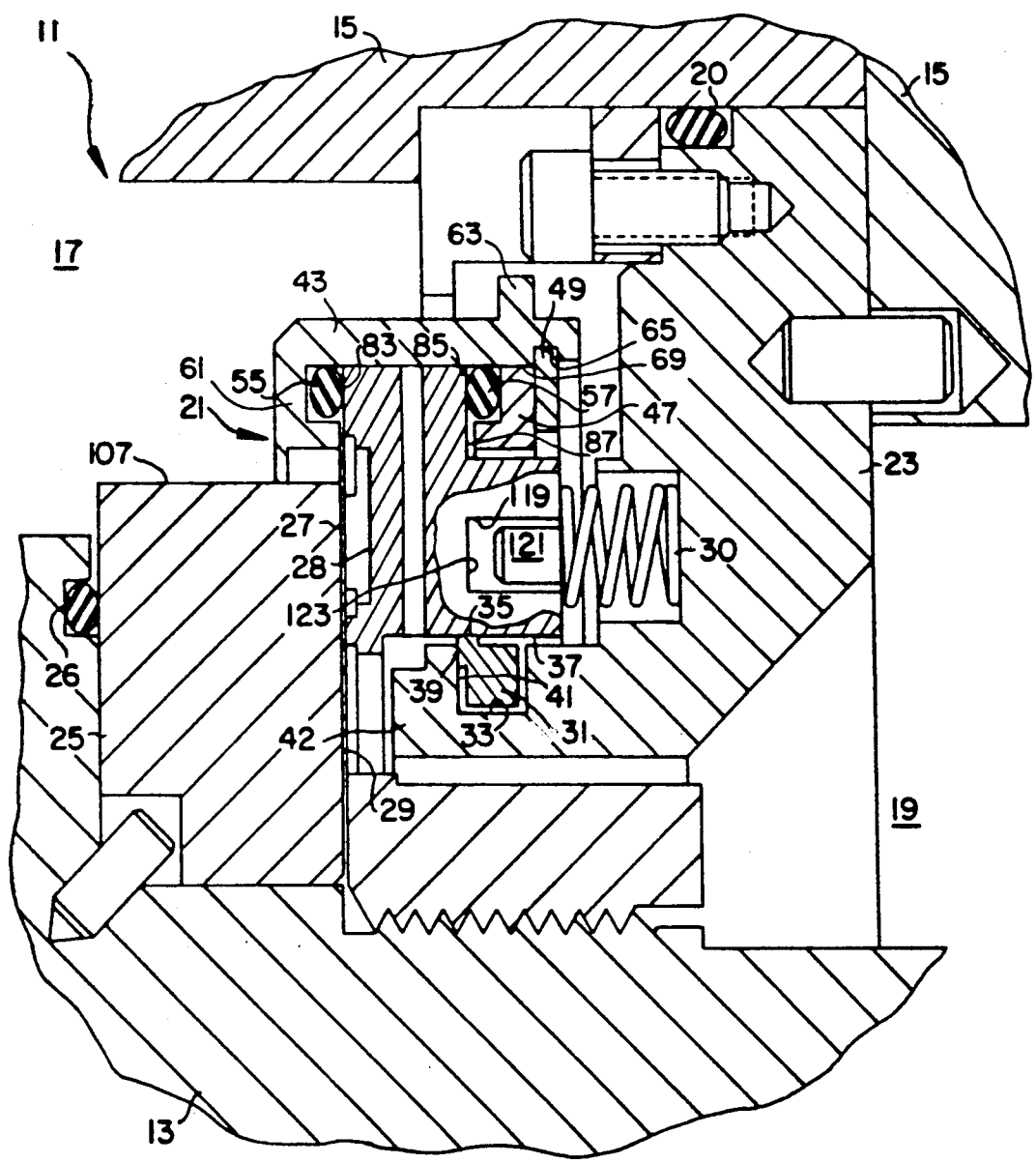
FIG. 1 is a view in section of a typical dry gas face seal assembly which has as one of its elements a stationary seal ring assembly constructed in accordance with this invention.
Figure 2:
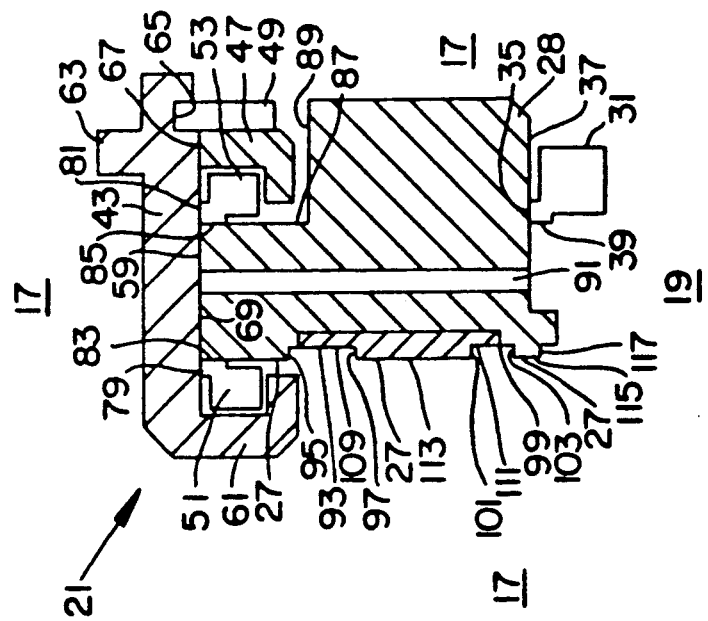
FIG. 2 is a view in section of a stationary seal ring assembly similar to that of FIG. 1.

Turning now to the drawings and especially FIGS. 1 and 2, there is shown a dry gas face seal assembly 11 for sealing a rotating shaft 13 in a stationary casing 15 which has a gas high-pressure side 17 and a low-pressure side 19. The dry gas face seal assembly 11 comprises a stationary seal ring assembly 21 mounted on a seal housing 23, and a rotating mating ring 25 affixed to shaft 13 which is rotatable therewith.

A static seal 26 is provided between rotatable mating ring 25 and shaft 13 to prevent the unwanted parasitic loss of gas from high-pressure side 17 to low-pressure side 19.

Housing 23 is affixed to stationary casing 15 and a static seal, 0-ring 20, is provided between housing 23 and stationary casing 15 to prevent the unwanted parasitic loss of gas from high-pressure side 17 to low-pressure side 19 through any space between housing 23 and casing 15.

A radially extending planar sealing face 27 on ring 28 of stationary seal ring assembly 21 is adapted to cooperate with a radially extending planar sealing face 29 on rotating mating ring 25 to provide a desired seal between the rings 28 and 25 and their sealing faces 27 and 29.

A plurality of springs 30 are mounted in seal housing 23 and abut the stationary seal ring 28 and urge the stationary seal ring 28 toward mating ring 25 so that seal face 27 sealingly engages seal face 29.

A secondary seal ring 31, preferably a ring made like a piston ring with a gap and made of carbon or of silicon carbide, is mounted in an annular groove 33 in the lower arm 42 of housing 23, and has an outermost circumference 35 which abuts an inner circumference 37 of the stationary seal ring 28 to provide a desired seal for circumference 35 and prevent the passage of gas from high-pressure side 17 to low-pressure side 19. A radially extending planar seal face 39 of secondary seal ring 31 abuts the radially extending face 41 of groove 33 to provide a seal therebetween and prevent loss of gas from high-pressure side 17 to low-pressure side 19 at this location. Stationary seal ring assembly 21 is mounted over the lower arm 42 of seal housing 23 by a clearance fit.

Referring to FIG. 2, the stationary seal ring assembly 21 comprises a shroud 43, seal ring 28, support ring 47, retaining ring 49, and two identical static seals 51 and 53. The construction of the stationary seal ring assembly 21 shown in FIGS. 1 and 2 differs only to the extent that the FIG. 1 static seals 55 and 57 are preferably elastomeric O-rings for sealing low temperature gas and the FIG. 2 static seals 51 and 53 are preferably rings, like piston rings with a gap and made of carbon, for sealing high temperature gas. Except for this, the construction of stationary seal ring assembly 21 is the same in FIGS. 1 and 2. The shroud 43, support ring 47, and retaining ring 49 are preferably all made of the same metallic materials, like steel, so as to have the same coefficient of thermal expansion. The face seal ring 28 is preferably made of carbon or silicon carbide.

The shroud 43 is mounted over the outermost circumference 59 of face seal ring 28 by a clearance fit and has an inwardly projecting radial flange section 61 which houses a static seal 51. Shroud 43 also has an outwardly projecting radial flange 63, and the flanges 61 and 63 serve to structurally stiffen the shroud 43 and reduce stress and deflections resulting from applied gas pressures. An annular groove 65 is incorporated in shroud 43 for seating retaining ring 49. Support ring 47 is mounted between static seal 53 and retaining ring 49 to urge the static seal 53 toward ring 28. The outer circumference 67 of support ring 47 fits within the inner circumference 69 of shroud 43.

An axial pre-compression is desirable in the case of elastomeric O-ring static seals 55 and 57, but is not preferred in the case of piston-ring type static seals 51 and 53.

The outermost circumferences 79 and 81 of static seals 51, 53 abut the inner circumference 69 of shroud 43 to effect a desired seal therebetween. Radial face 83 of static seal 51 abuts the radially extending planar seal surface 27 near the outer circumference 59 of face seal ring 28 to cause a desired seal against gas passage. Face 85 of static seal 53 abuts a radially extending face 87 of ring 28 to cause a desired seal and block passage of gas. A plurality of radial holes 91 are incorporated in and communicate through ring 28 from its outermost circumference 59 to its inner circumference 37 and serve to exhaust to low-pressure side 19 any gas leakage which may occur across static seals 51 and 53 or 55 and 57 from high-pressure side 17.

Recessed face 87 (FIG. 2) on ring 28 has an axial space relationship with faces 39, 41 (FIG. 1) in groove 33 so as to balance radial pressure forces. By referring to FIG. 3, it can be seen that this space relationship produces radially inward acting pressure forces represented by area JHML and radially outward acting pressure forces represented by area UVWX. These forces are equal and opposite and therefore cancel. It should be noted that pressure balancing geometry in the axial sense is located entirely on the ring 28 proper and not distributed among a multiplicity of parts.

Referring to FIGS. 2 and 4, an upper annular groove 93 is formed on sealing face 27 of face seal ring 28 and has an outer circumference or rim 95 and an inner circumference or rim 97. A lower annular groove 99 is formed on sealing face 27 of face seal ring 28 and has an outer circumference 101 and an inner circumference 103. A plurality of recesses 105 (FIG. 4) extend radially between upper groove 93 and lower annular groove 99 and distribute high-pressure gas to the lower groove 99 and insure that the high-pressure gas exerts its forces at the inner circumference 103 of lower annular groove 99 to balance the gas pressure across the radial seal face 27.

The inner circumference 97 of upper annular groove 93 is smaller in diameter than the outer circumference 107 (FIG. 1) of mating ring 25. Face 109 (FIG. 2) of upper annular groove 93 has a defined axial space relationship with face 111 of lower annular groove 99. The pressure forces acting at the outer circumference 95 of upper annular groove 93 act radially outwardly. The pressure forces acting at the inner circumference 103 of inner annular groove 99 act radially inwardly. These forces are equal and opposite and cancel.

A bearing pad 113 is formed on seal face 27 of face seal ring 28 between upper groove 93 and lower groove 99. The bearing pad 113 serves to lower the unit face bearing loading.

Figure 3:
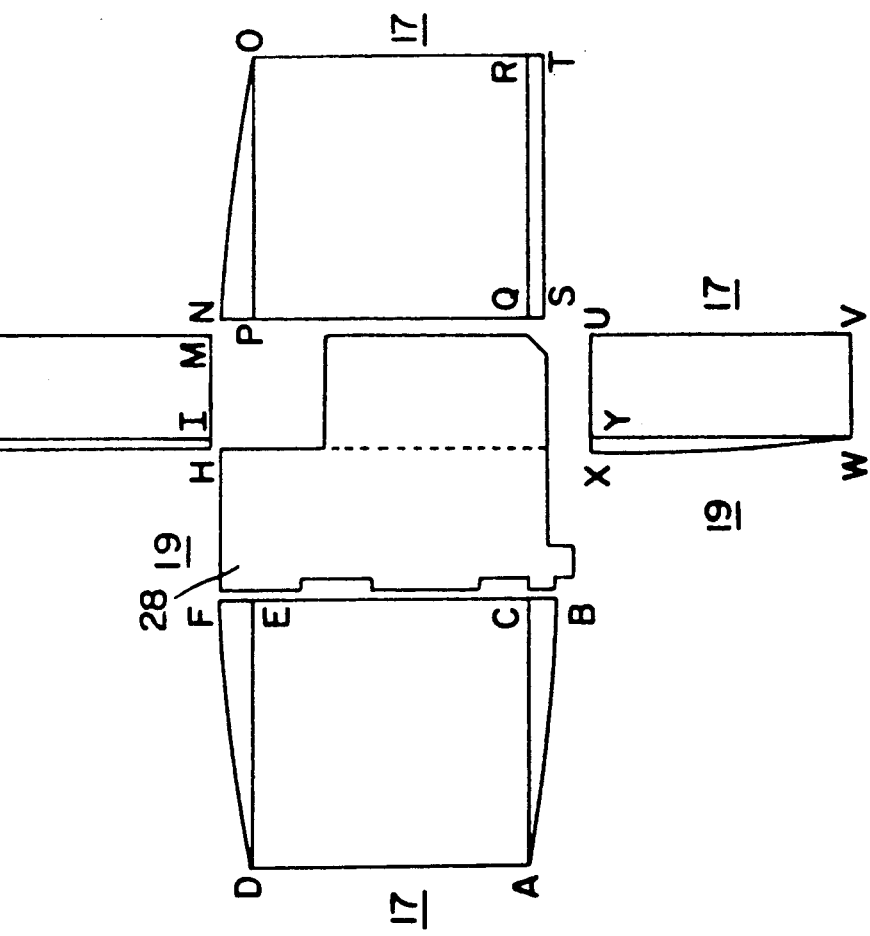
FIG. 3 is a view in section of the stationary seal ring of the stationary seal ring assembly with pressure distribution curves showing the radially and axially extending pressure forces acting on the stationary seal ring.

An annular seal dam 115 is formed on the inner or lower portion of seal face 27 having an outer circumference which is the inner circumference 103 of lower annular groove 99, and having an inner circumference 117. Circumferences 103 and 117 have a defined radial space relationship with inner circumference 37 of ring 28. Referring to FIG. 3 with the defined radial space relationship, the pressure forces acting on the seal face 27 are represented by the area ABFD. The pressure forces acting on the opposing side of face seal ring 28 are represented by area NOTS. These areas being equal and opposite, the forces cancel.

The face seal ring 28, and therefore stationary ring assembly 21, is fixed against rotation by a plurality of holes 119 (FIG. 1) in face seal ring 28 which are engaged by lock pins 121 mounted in seal housing 23. End face 123 of hole 119 has a defined axial space relationship with face 87 on face seal ring 28 and face 41 in groove 33 to avoid pressure distortion of face seal ring 28 by exposing a portion of hole 119 to pressure imbalance.

With the stationary seal ring assembly 21 being constructed in accordance with this invention, the shroud 43 accepts the applied gas pressure and allows the face seal ring 28 to remain for the most part structurally impervious to pressure forces.

ADVANTAGES

In the stationary seal ring assembly of this invention, the surface of one of the rings is provided with a plurality of radial slots extending between upper and lower annular grooves to channel high-pressure gas from the upper annular groove to the lower annular groove so that the gas exerts balancing pressures against the upper rim of the upper annular groove and against the lower rim of the lower annular groove. A flat dam section is provided below the lower annular groove. The dam, in conjunction with the radial face of the rotating ring, seals the housing.

The seal ring assembly of this invention is provided with a shroud mounted on the outer circumference of the stationary ring for holding static seals against the sealing face and other face of the stationary ring near its outer circumference, and for holding the stationary ring against deflection. Radial bleed holes in the stationary ring exhaust to atmosphere any gas from the highpressure side of the seal unit that penetrates the static seals.

Also, a secondary seal is seated in the housing and extends radially to contact the bore of the stationary seal ring to radially seal the stationary ring.

The inner face of the stationary seal is in the same plane as the inner face of the inner static seal which is held against the other face of the ring by the shroud assembly.

In operation, the forces against seal ring 28 are substantially equally balanced on its sealing face, on its other face, on its bore, on the upper rim of its upper annular groove, and on the lower rim of its lower annular groove. This balancing of the forces on ring 28 relieves ring 28 from unwanted and undesirable stresses which may tend to cantilever the upper portion of seal ring 28 one way and the lower portion of seal ring 28 the other way.

I claim:

1. A stationary seal ring assembly (21) for a dry gas face seal unit (11) for sealing a rotating shaft (13) in a casing or housing (15) in a gas turbine, or compressor, to seal the highpressure side (17) of the unit (11) from the lowpressure side (19), comprising a stationary face seal ring (28) mounted on a seal housing (23), and having a bore (37), a rotatable mating ring (25) mounted on a shaft (13) and rotatable therewith, said shaft (13) having an axis of rotation, a sealing face (27) on said stationary face seal ring (28) adapted to cooperate with a sealing face (29) on mating ring (25) to effect a desired seal therebetween, a shroud (43) mounted on the radial outer circumference of the stationary face seal ring (28) for holding said stationary face seal ring (28) against deflection, means (47,49,55,57), for sealingly mounting the shroud (43) on the radial outer periphery of said stationary face seal ring (28), radial bleed holes (91) in the stationary face seal ring (28) for exhausting to the atmosphere (19) any gas from the high-pressure side (17) of said seal unit (11) that penetrates the gas seal between the shroud (43) and the stationary face seal ring (28), a secondary seal ring (31) seated in the housing (23) and extending radially to contact the bore (37) of the stationary face seal ring (28) to seal the bore (37) of the stationary face seal ring (28) against the escape of high-pressure gas, said secondary seal ring (31) being a gapped ring made of carbon, the secondary seal ring (31) being seated in a groove (33) in the seal housing (23) with a radially extending planar sealing surface (39) abutting radially an extending surface (41) of the groove (33), and said surfaces (39), (41) having a radial space relationship with a radially extending surface (87) on said stationary face seal ring (28) so as to balance pressure forces, an outer-radial annular groove (93) formed in the sealing face (27) of the stationary face seal ring (28) and having a radial outer axial rim (95) and a radial inner axial rim (97), an inner-radial annular groove (99) formed in the sealing face (27) of said stationary face seal ring (28) and having a radial outer axial rim (101) and a radial inner axial rim (103), a plurality of radial slots (105) extending between the radial outer (93) and radial inner (99) annular grooves to channel the high-pressure gas between the radial outer annular groove (93) and the radial inner annular groove (99) so that the gas exerts balancing pressures against the radial outer axial rim (95) of the radial outer annular groove (93) and against the radial inner axial rim (103) of the radial inner annular groove (99), a bearing pad (113) formed in the sealing face (27) between the radial outer (93) and radial inner (99) annular grooves, an annular seal dam (115) formed in the radial inner portion of the seal face (29) of the stationary ring (28) radially inward of the inner annular groove (99), the radial inner axial rim (97) of the radial outer annular groove (93) being positioned radially inward of a rim (107) of the rotating ring (25) so as to avoid wearing a step in the face (29) of said stationary face seal ring (28).

2. The stationary seal ring assembly of claim 1, said mounting means comprising a support ring (47) and a retaining ring (49) which, together with the shroud (43), urge a pair of static seals against opposite faces of the stationary seal ring (28).

3. The stationary seal ring assembly of claim 2, said static seals (55), (57) being elastomeric and mounted in said shroud (43) such that an axial squeeze load only is imparted by said retaining ring (49), said support ring (47), and a flange (61) of said shroud (43), and said static seals (51,53) press against said stationary face seal ring (28) at said stationary face seal ring (27) and said radially extending surface (87) to create sealings thereat and minimize distortion.

4. The stationary seal ring assembly of claim 1, said face seal ring being made of siliconcarbide.

* * * * *